(12) United States Patent
Kato et al.

(10) Patent No.: US 8,220,899 B2
(45) Date of Patent: Jul. 17, 2012

(54) PRETREATMENT LIQUIDS, INK CARTRIDGE ASSEMBLIES, PRETREATED RECORDING MEDIA, AND METHODS OF RECORDING

(75) Inventors: Masahito Kato, Nagoya (JP); Masahiro Nishizaki, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 968 days.

(21) Appl. No.: 12/054,999

(22) Filed: Mar. 25, 2008

(65) Prior Publication Data

US 2008/0241397 A1 Oct. 2, 2008

(30) Foreign Application Priority Data

Mar. 30, 2007 (JP) ................. 2007-090470

(51) Int. Cl.
*B41J 2/01* (2006.01)
*B41J 2/05* (2006.01)

(52) U.S. Cl. .................. 347/21; 347/100; 347/101

(58) Field of Classification Search ............ 347/21, 347/95, 96, 101, 105, 107
See application file for complete search history.

(56) References Cited

U.S. PATENT DOCUMENTS

| | | | | |
|---|---|---|---|---|
| 5,618,338 A * | 4/1997 | Kurabayashi et al. | ..... | 106/31.37 |
| 5,640,187 A | 6/1997 | Kashiwazaki et al. | | |
| 5,993,524 A * | 11/1999 | Nagai et al. | ................ | 106/31.27 |
| 6,106,598 A | 8/2000 | Iijima | | |
| 6,126,281 A * | 10/2000 | Shimoda et al. | ............. | 347/101 |
| 6,261,349 B1 | 7/2001 | Nagai et al. | | |
| 6,286,953 B1 * | 9/2001 | Takemoto et al. | ............ | 347/100 |
| 6,517,199 B1 | 2/2003 | Tomioka et al. | | |
| 6,536,890 B1 | 3/2003 | Kato et al. | | |
| 6,616,255 B2 | 9/2003 | Murakami et al. | | |
| 6,830,709 B2 | 12/2004 | Tomioka et al. | | |
| 6,863,391 B2 | 3/2005 | Tomioka et al. | | |
| 7,040,747 B2 | 5/2006 | Kubota et al. | | |
| 2003/0064206 A1 * | 4/2003 | Koyano et al. | ................ | 428/195 |
| 2005/0007431 A1 * | 1/2005 | Koyano et al. | .................. | 347/95 |
| 2005/0012798 A1 | 1/2005 | Adachi et al. | | |
| 2006/0071990 A1 * | 4/2006 | Hirakawa | ......................... | 347/95 |
| 2006/0214970 A1 * | 9/2006 | Hirakawa | ......................... | 347/15 |
| 2008/0246821 A1 | 10/2008 | Pauly | | |

FOREIGN PATENT DOCUMENTS

| | | |
|---|---|---|
| JP | H10-250216 A | 9/1989 |
| JP | H04-259590 A | 9/1992 |
| JP | H06-092010 A | 4/1994 |
| JP | H11-228890 A | 8/1998 |
| JP | 2000034432 A | 2/2000 |
| JP | 2001-171095 A | 6/2001 |
| JP | 2001-199151 A | 7/2001 |
| JP | 2002-201385 A | 7/2002 |
| JP | 2002205457 A | 7/2002 |
| JP | 2002-225414 A | 8/2002 |
| JP | 2002292890 A | 10/2002 |
| JP | 2002-331742 A | 11/2002 |
| JP | 2003-039811 A | 2/2003 |
| JP | 2003-211820 A | 7/2003 |
| JP | 2004-090456 A | 3/2004 |
| JP | 2007-056217 A | 3/2007 |
| JP | 2007-062024 A | 3/2007 |
| JP | 2008-246821 A | 10/2008 |

* cited by examiner

*Primary Examiner* — Stephen Meier
*Assistant Examiner* — Leonard S Liang
(74) *Attorney, Agent, or Firm* — Baker Botts L.L.P.

(57) ABSTRACT

A pretreatment liquid for ink-jet recording by applying the pretreatment liquid to a recording medium, the pretreatment liquid including fine particles and a solvent. Specifically, a contact angle between the pretreatment liquid and a surface of the recording medium is greater than or equal to about 75 degrees.

6 Claims, 3 Drawing Sheets

(A)

(B)

PRETREATMENT LIQUIDS, INK CARTRIDGE ASSEMBLIES, PRETREATED RECORDING MEDIA, AND METHODS OF RECORDING

CROSS-REFERENCE TO RELATED APPLICATION

The present application claims priority from Japanese Patent Application No. 2007-090470, which was filed on Mar. 30, 2007, the disclosure of which is incorporated herein by reference in its entirety.

BACKGROUND OF THE INVENTION

1. Field of the Invention

The present invention relates generally to pretreatment liquids, ink cartridge assemblies, pretreated recording media, and methods of recording.

2. Description of the Related Art

Various types of special paper, such as gloss coated paper, matt coated paper, gravure coated paper, and the like, are known and are used for ink-jet recording. The special paper is used to obtain an image with a high optical density and chroma. The special paper is manufactured by applying a material for improving printing quality, e.g., fine particles, surfactant, and/or the like, to a surface of a recording medium, such as plain paper. The cost of the special paper is greater than the cost of plain paper. Moreover, when a user selectively uses both the special paper and plain paper, the user has to switch between the special paper and plain paper by replacing the special paper positioned in a paper tray with plain paper as required, or vice versa.

The printing speed of known ink-jet recording apparatus recently has increased, and a quick-drying ink composition having high permeability to a recording medium has been studied. Nevertheless, as the permeability of the ink increases, the quality of the image on the recording medium deteriorates. In particular, the optical density and feathering, which tire affected by a fiber of the recording paper, are deteriorated.

To address these issues, in a known method of recording an image on a recording medium, such as the method described in Japanese Patent Application Laid-open No. H10(1998)-250216, color ink is dispensed onto a surface of the recording medium after a pretreatment liquid containing the surfactant is applied the entire surface of the recording medium using a roller. Nevertheless, the pretreatment liquid is relatively expensive, and to cover the entire surface of the recording medium, a relatively large amount of the pretreatment liquid is consumed.

In another known method of recording an image on a recording medium, such as the method described in Japanese Patent Application Laid-open Nos. H4(1992)-259590, H6(1994)-92010, 2000-34432, and 2002-205457, color ink is dispensed onto a surface of the recording paper after dispensing a pretreatment liquid containing the fine particles onto a recording area and onto an area in the vicinity of the recording paper using an ink-jet method.

SUMMARY OF THE INVENTION

Therefore, a need has arisen for pretreatment liquids, ink cartridge assemblies, pretreated recording media, and methods of recording which overcome these and other shortcomings of the related art. A technical advantage of the present invention is that an amount of pretreatment liquid consumed may be reduced, thereby reducing costs, without reducing the quality of the image recorded on the recording medium.

According to an embodiment of the present invention, a pretreatment liquid for ink-jet recording by applying the pretreatment liquid to a recording medium, the pretreatment liquid comprising fine particles and a solvent. Specifically, a contact angle between the pretreatment liquid and a surface of the recording medium is greater than or equal to about 75 degrees.

According to another embodiment of the present invention, an ink cartridge assembly for an ink-jet recording apparatus comprises at least one ink cartridge comprising at least one ink, a pretreatment liquid cartridge comprising a pretreatment liquid, dispensing the pretreatment liquid onto a recording medium to form a pretreatment layer thereon, dispensing the at least one ink onto the pretreatment layer, wherein a contact angle between the pretreatment liquid and a surface of the recording medium is greater than or equal to about 75 degrees.

According to yet another embodiment of the present invention, a pretreated recording medium comprises a surface, and a pretreatment liquid dispensed onto a predetermined portion of the surface. The predetermined portion of the surface comprises a recording portion, and the pretreatment liquid comprises fine particles, and a solvent. Moreover, a contact angle between the pretreatment liquid and the predetermined portion of the surface is greater than or equal to about 75 degrees.

According to still yet another embodiment of the present invention, a method of recording medium comprises the step of dispensing a pretreatment liquid onto a predetermined portion of the recording medium to form a pretreatment layer thereon. The predetermined portion of the recording medium comprises a recording portion, and the pretreatment liquid comprises fine particles, and a solvent. Moreover, a contact angle between the pretreatment liquid and a surface of the recording medium is greater than or equal to about 75 degrees. The method also may comprise the step of dispensing at least one ink onto the pretreatment layer.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

EMBODIMENTS OF THE PRESENT INVENTION

Figure 1:
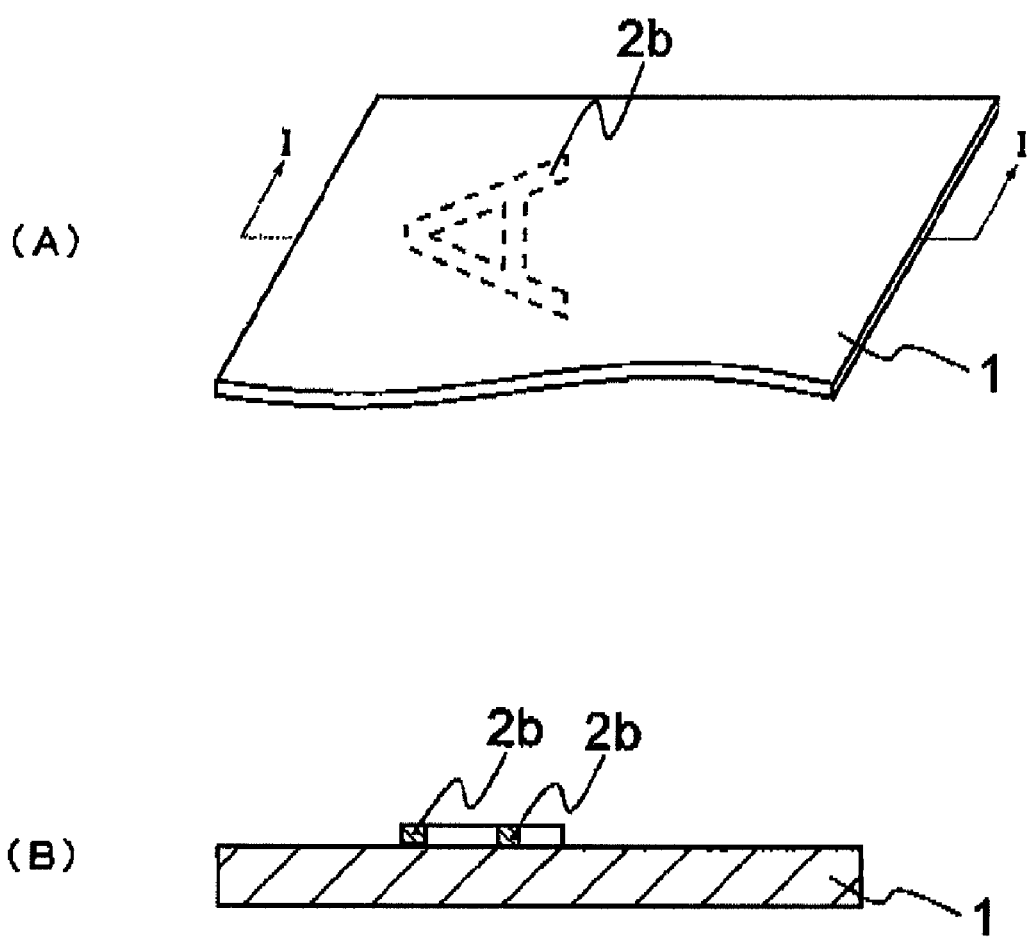
FIG. 1(A) is a perspective view of a pretreated recording paper, according to an embodiment of the present invention.
FIG. 1(B) is a cross-sectional view of the pretreated recording paper of FIG. 1(A), taken along line I-I.
Figure 2:
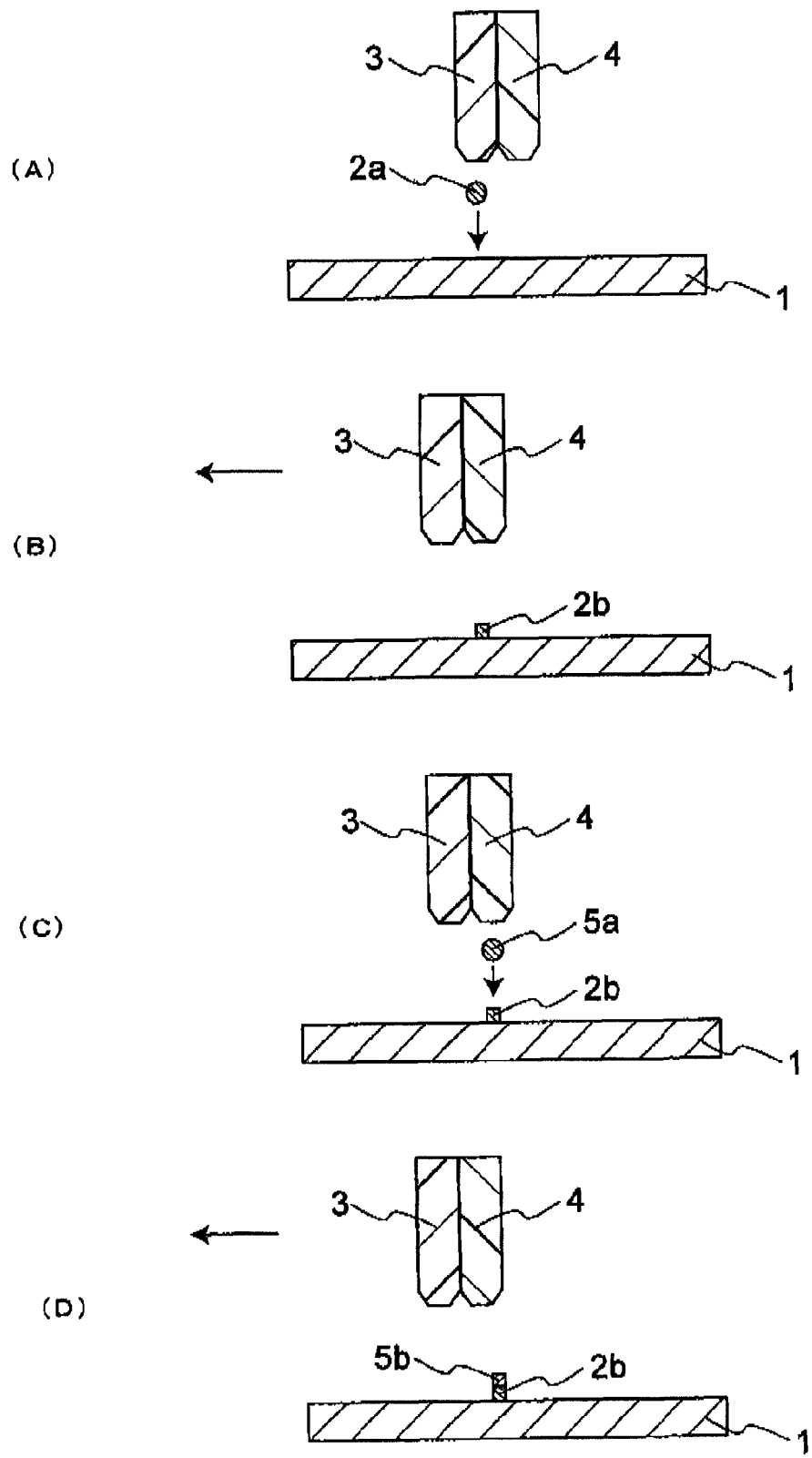
FIGS. 2(A)-2(D) are a view showing a method of ink-jet recording, according to an embodiment of the present invention.
Figure 3:
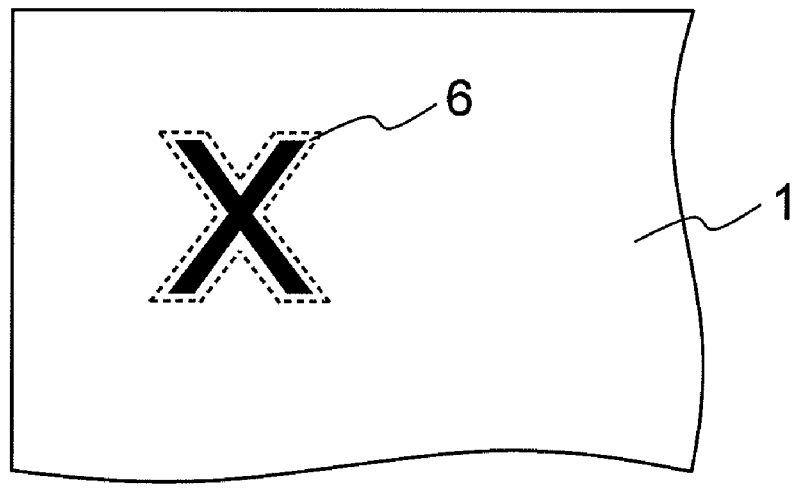
FIGS. 3(A) and 3(B) are a view showing an area in which a pretreatment is performed, according to an embodiment of the present invention.
Figure 3:
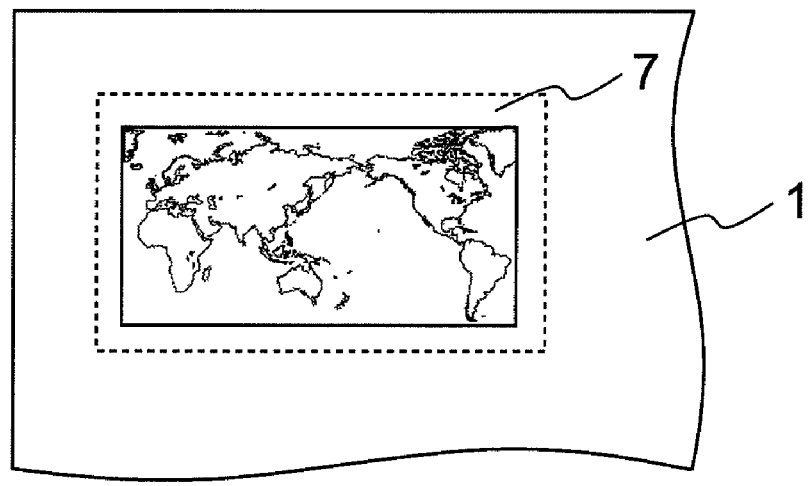

Embodiments of the present invention and their features and technical advantages may be understood by referring to FIGS. 1(A)-3(B), like numerals being used for like corresponding portions in the various drawings.

Referring to FIGS. 1(A) and 1(B), a recording medium 1, e.g., a plain paper, may comprise a pretreatment layer 2b formed on a recording area thereof. The recording area may correspond to a portion of the recording medium 1 onto which an image is to be formed using an image forming apparatus, such as a printer, e.g., an ink-jet printer. The recording area may be on one side of the recording medium 1 or on both sides of the recording medium 1. An area of the pretreatment layer 2b may be larger than an area of the recording area, e.g., may be formed on entire surface of the recording medium 1.

An ink cartridge assembly (not shown) may comprise at least one ink cartridge comprising an ink 5a, e.g., a color ink comprising at least one dye and/or at least one pigment, and at least one pretreatment liquid cartridge comprising a pretreatment liquid 2a. The ink cartridge and the pretreatment liquid cartridge may be a single body.

Referring to FIGS. 2(A)-2(D), a method of recording on recording medium 1 is depicted. As shown FIG. 2(A), the pretreatment liquid 2a is dispensed from a pretreatment liquid dispensing unit 3 for dispensing the pretreatment liquid 2a onto the recording area of the recording medium 1. The type of dispensing performed by the predetermined liquid dispensing unit 3 for dispensing the pretreatment liquid 2a may be any known method of dispensing, such as, but not limited to, an electrostatic suction type method, a piezoelectric element type method, a thermal type method, or the like. In the electrostatic suction type method, the pretreatment liquid 2a is dispensed by an electrostatic force in response to an application of high voltage. In the piezoelectric element type method, the pretreatment liquid 2a is dispensed in response to mechanical vibration or displacement of the piezoelectric element relative to the pretreatment liquid 2a. In the thermal type method, the pretreatment liquid 2a is dispensed by a foam pressure in response to an application of heat to the pretreatment liquid 2a.

Referring to FIG. 2(B), a pretreatment layer 2) is formed on the recording area of the recording medium 1 when the pretreatment liquid 2a reaches the surface of the recording medium 1, such that the recording area of the recording medium 1 is pretreated. A contact angle between the pretreatment liquid 2a and the surface of the recording medium may be greater than or equal to about 75 degrees. Then, as indicated by an arrow in FIG. 2(B), the pretreatment liquid dispensing unit 3 for dispensing the pretreatment liquid 2a and an ink dispensing unit 4 for dispensing ink 5a are moved, such that the ink dispensing unit 4 for dispensing ink 5a is located above the pretreatment layer 2b.

Referring to FIG. 2(C), ink 5a is dispensed from the ink dispensing unit 4 for dispensing ink 5a onto the pretreatment layer 2b using a method the same or substantially the same as the method for dispensing the pretreatment liquid 2a. When a plurality of ink dispensing unit 4 for dispensing ink 5a are provided, different colors of ink are sequentially dispensed from respective ink dispensing unit 4 for dispensing ink 5a onto the recording area. Thereby, the different colors of ink are mixed on the pretreatment layer 2b to form a desired color.

Referring to FIG. 2(D), an ink layer 5b is formed when the ink 5a reaches the pretreatment layer 21. Then, as indicated by an arrow in FIG. 2(D), the pretreatment liquid dispensing unit 3 for dispensing pretreatment liquid 2a and the ink dispensing unit 4 for dispensing ink 5a are moved, such that the means 3 for dispensing pretreatment liquid 2a are located above the next recording area. The process shown in FIGS. 2(A)-2(D) then may be repeated, kind an image is recorded on the recording medium 1.

Referring to FIGS. 3(A) and 3(B), in an embodiment of the present invention, the area which is pretreated may be larger than the recording area. For example, as shown in FIG. 3(A), when an image to be recorded on the recording medium 1 is a letter, such as the letter "X" in this example, an area 6 to be pretreated corresponds to the area which the letter is to be recorded and the area surrounding, e.g., the area in the vicinity of or adjacent to, the outline of the letter, which in this example corresponds to an area enclosed by a dashed line. In another example, as shown in FIG. 3(B), when an image to be recorded on the recording medium 1 is a picture or a photograph, an area 7 to be pretreated is the area on which the picture or photograph is to be recorded and the area surrounding the outline of the picture or photograph, which in this example corresponds to an area enclosed by a dashed line. The surrounding area may be, for example, an area about one dot to five dots away from the outside of an area on which a dot of the ink is applied.

The pretreatment liquid 2a comprises fine particles and a solvent. The fine particles may be inorganic fine particles and/or organic fine particles. For example, the inorganic fine particles may comprise at least one inorganic oxide, such as silica, titanium dioxide, alumina, titania, and zirconia, fine particles of composite oxide of silica, titanium dioxide, alumina, titania, and zirconia; and magnesium, calcium, strontium, barium, zinc, boron, germanium, tin, lead, zirconium, indium, phosphorus, vanadium, niobium, tantalum, chromium, molybdenum, tungsten, manganese, iron, cobalt, nickel, and ruthenium.

The pretreatment liquid 2a may be a colloidal solution comprising the at least one inorganic fine particles. Such a colloidal solution may be a colloidal silica, such as SNOWTEX® XL and SNOWTEX®-PS-S manufactured by NISSAN CHEMICAL INDUSTRIES, LTD.

The organic fine particles may comprise at least one resin, such as acrylic resin, polyvinyl acetate resin, styrene-butadiene resin, acrylic-styrene resin, butadiene resin, styrene resin, polyurethane resin, polyolefin resin, polyester resin, polyamide resin, melamine resin, urea resin, silicone resin, fluorine resin, and polybutene rosin. The organic fine particles also may comprise at least one emulsion. Examples of the emulsion include MUTICLE® series manufactured by MITSUI TOATSU CHEMICALS INCORPORATED, ME series manufactured by SOKEN CHEMICAL & ENGINEERING CO., LTD., JURYMER® ME series manufactured by NIHON JUNYAKU CO., LTD., Tospearl® series manufactured by TOSHIBA SILICONES CO., LTD, EPOSTAR® series manufactured by NIPPON SHOKUBAI CO., LTD., MICROGEL® series manufactured by NIPPON PAINT CO., LTD., and Fluon® series manufactured by ASAHI GLASS CO., LTD.

The ratio of the fine particles (in solid equivalent) to the total amount of the pretreatment liquid 2a may be between about 3% by weigh and about 30% by weight, between about 5% by weight and about 15% by weight. The number average diameter of the fine particles may be between about 30 nm and about 200 nm, between about 40 nm and about 160 nm.

The solvent may comprise water, e.g., deionized water, and a water-soluble organic solvent. The ratio of the water to the total amount of the pretreatment liquid 2a may be based on the type and the composition of the water-soluble organic solvent and desired pretreatment liquid 2a characteristics. A known water-soluble organic solvent may be used. The water-soluble organic solvent may comprise polyalcohol, polyalcohol derivative, alcohol, amide, ketone, other, nitrogen-containing solvent, sulfur-containing solvent, propylene carbonate, or ethylene carbonate, or any combination thereof. The polyalcohol may comprise glycerin, ethylene glycol, diethylene glycol, propylene glycol, butylene glycol, triethylene glycol, polyethylene glycol, trimetylolpropane, 1,5-pentanediol, and 1,2,6-hexanetriol. The polyalcohol derivative may comprise ethylene glycol monomethyl ether, ethylene glycol monoethyl other, ethylene glycol monobutyl ether, diethylene glycol monomethyl ether, diethylene glycol monoethyl ether, diethylene glycol monobutyl ether, propylene glycol monopropyl ether, propylene glycol monobutyl ether, dipropylene glycol monopropyl other, and dipropylene glycol monobutyl ether. The alcohol may comprise ethanol, isopropyl alcohol, n-butyl alcohol, isobutyl alcohol, and benzyl alcohol. The amide may comprise dimethylformamide and dimethylacetamide. The ketone may comprise acetone. The ether may comprise tetrahydrofuran and dioxane. The nitrogen-containing solvent may comprise pyrolidone, N-methyl-2-pyrolidene, cyclohexyl pyrolidone, and triethanolamine. The sulfur-containing solvent may comprise thiodiethanol, thiodiglycerol, sulfolane, and dimethylsulfoxide.

The pretreatment liquid 2a of the present invention comprises the fine particles and the solvent. The pretreatment liquid 2a also may comprise at least, one known additive. Examples of the at least one additive include a surfactant, a viscosity modifier, a surface tension modifier, a mildewproofing agent, a pH adjuster, an antioxidant, an ultraviolet absorber, and a chelator. The pretreatment liquid 2a may be prepared by adding the additive to the solvent comprising the fine particles, and then uniformly dispersing. The pretreatment liquid 2a may be dispersed using a known stirring device, such as a ball mill, a sand mill, a homomixer, and a moving vane.

In an embodiment of the present invention, a contact angle between a surface of the recording medium 1 and the pretreatment liquid 2a may be greater than or equal to about 75 degrees. For example, the contact angle may be between 75 degrees and about 130 degrees, between about 100 degrees and about 120 degrees. Accordingly, the pretreatment liquid 2a slowly penetrates the recording medium 1, such that before the pretreatment liquid 2a penetrates the recording medium 1, the solvent is vaporized, and a pretreatment layer 2b of the fine particles is formed on the area including the recording area of the recording medium 1. Moreover, persons of ordinary skill in the art readily may be obtained a desired contact angle by adjusting, for example, the type of the fine particles, the amount of the fine particles, and the composition of the pretreatment liquid 2a. The contact angle may be measured by a method in accordance with the examples described below.

EXAMPLES

Embodiments of the present invention now will be further clarified by a consideration of the following examples, which are intended to be purely exemplary.

Example 1

The colloidal silica (SNOWTEX®-PS-S manufactured by NISSAN CHEMICAL INDUSTRIES, LTD.) was uniformly dispersed in a mixed solvent of deionized water (80% by weight) and glycerin (10% by weight) so that the rate of the colloidal silica to the total amount of the mixed solvent became 10% by weight in solid equivalent. In this manner, a pretreatment liquid of this example was produced.

Example 2

A pretreatment liquid of this example was produced by the same manner as in Example 1, except that the rate of deionized water was reduced to 79% by weight and 1% by weight of dipropylene glycol monopropyl ether was added.

Comparative Example 1

A pretreatment liquid of this comparative example was produced by the same manner as in Example 1, except that the rate of deionized water was reduced to 75% by weight and 5% by weight of dipropylene glycol monopropyl ether was added.

Comparative Example 2

A pretreatment liquid of this comparative example was produced by the same manner as in Example 1, except that the rate of deionized water was reduced to 76.7% by weight and 3.3% by weight of acrylic resin emulsion ("JONCRYL® 711" manufactured by Johnson Polymer, Inc.) was added.

Evaluation

A recording area of a recording paper was pretreated by dispensing the pretreatment liquid of the aforementioned examples and comparative examples by an ink-jet recording method. Then, a recording was performed by dispensing an ink onto the recording area by an ink-jet recording method. For the recording paper, DATA COPY paper manufactured by M-real was used. For the ink, yellow ink, magenta ink, cyan ink, and black ink of ink cartridges LC600Y, LC600M, LC600C, and LC600BK for an ink-jet printer mounted digital multi-function center MFC-5200J manufactured by Brother Industries, Ltd, were used. Dispensing of the pretreatment liquid and the color ink were performed one color by one color with ink-jet printer mounted digital multi-function center by filling up the ink cartridge, which was mountable to the ink-jet printer mounted digital multi-function center, with the pretreatment liquid. The ink-jet printer mounted digital multi-function center was always cleaned after completion of the dispensing of one ink so that the next color was not affected by the former color. Characteristics and properties in each example and comparative example were evaluated or measured by the following method.

(I) Contact Angle Between the Pretreatment Liquid and the Surface of Recording Paper The contact angle between the pretreatment liquid and the surface of the recording paper was measured by a contact angle meter Drop Master 700 manufactured by KYOWA INTERFACE SCIENCE CO., LTD.

(II) Ink Bleed

Onto the recording area pretreated with the pretreatment liquid, ruled lines were printed by dispensing the respective inks of yellow, magenta, cyan, and black by the ink-jet recording method. On the basis of the results of this printing, it was visually evaluated according to the following evaluation criteria.

Ink Bleed Evaluation Criteria

A: In all ruled lines printed with the respective inks, the ink bleed was not found and clear ruled lines were obtained.

B: In any of ruled lines printed with the respective inks, the ink bleed was found a little.

C: In any of ruled lines printed with the respective inks, the ink bleed was clearly found and an irregularity was formed in the ruled lines.

(III) Color Unevenness

Onto the recording area pretreated with the pretreatment liquid, 100% duty images were created in a predetermined area by dispensing the respective inks of yellow, magenta, cyan, and black by the ink-jet recording method. The 100% duty images were visually evaluated according to the following evaluation criteria. In this state, "duty" of the 100% duty image is a value calculated by the following formula (I), and "100% duty" means a maximum weight of mono-color ink relative to pixel;

duty(%)={actual printing dot number/(longitudinal resolution×lateral resolution)}×100    (I)

actual printing dot number: actual printing dot number per unit area
longitudinal resolution: longitudinal resolution per unit area
lateral resolution: lateral resolution per unit area
Color Unevenness Evaluation Criteria
A: In all 100% duty images created with the respective inks, clear 100% duty images without color unevenness were obtained.
B: In any of 100% duty images created with the respective inks, a part of the 100% duty image was lightened.
C: In any of 100% duty images created with the respective inks, the whole 100% duty image was lightened or heightened.
(IV) Color Improving Effects
Onto the recording area pretreated with the pretreatment liquid, recording samples were created by dispensing the respective inks of yellow, magenta, and cyan by the ink-jet recording method. With respect to this sample, optical density (OD) and chroma (C*) were measured. On the basis of the measurements, it was evaluated according to the following evaluation criteria. In this state, the optical density (OD) was measured by a reflex densitometer RD-914 (trade name) manufactured by Gretag-macbeth. Further, chroma (C*) was calculated by the following equation (II) on the basis of a* value and b* value measured by a spectrophotometric meter SC-T (trade name) manufactured by SUGA TEST INSTRUMENTS CO., LTD. The values of a* and b* are according to the L* a* b* calorimetric system standardized in International Commission on Illumination (CIE) in 1976 (CIE 1976 (L* a* b*) colorimetric system) (see JIS (Japanese industrial Standards) Z 8729):

Chroma($C^*$)={$(a^*)^2+(b^*)^2$}$^{1/2}$    (II)

Color Improving Effects Evaluation Criteria
A: In all recording samples created with the respective inks, both of the density (OD) and chroma (C) were increased by 10% or more than 10% relative to a standard sample which was not pretreated.
B: In any of recording samples created with the respective inks, any one of density (OD) and chroma (C*) was increased by less than 10% relative to the standard sample which was not pretreated.
C: Neither A nor B.

The following Table 1 shows the composition of the pretreatment liquid and the evaluation result of the characteristics and properties of each examination and comparative examination.

TABLE 1

|  |  | Example | | Comparative Example | |
|---|---|---|---|---|---|
|  |  | 1 | 2 | 1 | 2 |
| Colloidal Silica (SNOWTEX ® -PS-S) | Rate (1*) (% by weight) | 10 | 10 | 10 | 10 |

TABLE 1-continued

|  |  | Example | | Comparative Example | |
|---|---|---|---|---|---|
|  |  | 1 | 2 | 1 | 2 |
| JONCRYL ®711 | Rate (% by weight) | — | — | — | 3.3 |
| Glycerin | Rate (% by weight) | 10 | 10 | 10 | 10 |
| Deionized Water | Rate (% by weight) | 80 | 79 | 75 | 76.7 |
| Dipropylene Glycol Monopropyl Ether | Rate (% by weight) | — | 1 | 5 | — |
| Contact Angle between Pretreatment Liquid and Surface of Recording Paper (degree) | | 115 | 105 | 70 | 55 |
| Ink Bleed | | A | A | B | B |
| Color Unevenness | | A | A | B | B |
| Color Improving Effects | | A | A | B | C |

(1*) the rate of the colloidal silica in solid equivalent

As shown in Table 1, when the recording area of the recording paper was pretreated with the pretreatment liquid of the Examples 1 and 2, high quality of printing could be obtained. On the other hand, when the recording area of the recording paper was pretreated with the pretreatment liquid of the Comparative Examples 1 and 2, quality of printing was inferior to that of the Examples 1 and 2.

While the invention has been described in connection with embodiments of the invention, it will be understood by those skilled in the art that variations and modifications of the embodiments described above may be made without departing from the scope of the invention. Other to embodiments will be apparent to those skilled in the art, from a consideration of the specification or from a practice of the invention disclosed herein. It is intended that the specification and the described examples are consider exemplary only, with the true scope of the invention indicated by the following claims.

What is claimed is:

1. A method of recording, comprising the steps of dispensing a pretreatment liquid onto a predetermined portion of the recording medium to form a pretreatment layer thereon, wherein a surface of the recording medium comprises a recording portion, and the pretreatment liquid comprises:
   fine particles; and
   a solvent, wherein a contact angle between the pretreatment liquid and the predetermined portion of the recording medium is between about 100 degrees and about 120 degrees; and
   dispensing at least one ink onto the pretreatment layer.

2. The method of claim 1, wherein a ratio of the fine particles to a total amount of the pretreatment liquid is between about 3% by weight and about 30% by weight in solid equivalent.

3. The method of claim 1, wherein the step of dispensing the pretreatment liquid comprises the step of dispensing the pretreatment liquid using an inkjet method.

4. The method of claim 1, wherein an area of the predetermined portion is larger than an area of the recording portion.

5. The method of claim 1, wherein the recording medium comprises a plain paper.

6. The method of claim 1, wherein the at least one ink comprises a dye.

* * * * *